US008754142B2

(12) United States Patent
Delaviz et al.

(10) Patent No.: US 8,754,142 B2
(45) Date of Patent: *Jun. 17, 2014

(54) POLYSTYRENE/POLYETHYLENE OXIDE COPOLYMER CELL SIZE ENLARGER FOR FOAM

(71) Applicant: Owens Corning Intellectual Capital, LLC, Toledo, OH (US)

(72) Inventors: Yadollah Delaviz, Lewis Center, OH (US); Raymond M. Breindel, Hartville, OH (US); Klin Rodrigues, Signal Mountain, TN (US); Bharat Patel, Princeton, NJ (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,371

(22) Filed: Jan. 7, 2013

(65) Prior Publication Data

US 2013/0190413 A1 Jul. 25, 2013

Related U.S. Application Data

(62) Division of application No. 12/696,553, filed on Jan. 29, 2010, now Pat. No. 8,349,909.

(51) Int. Cl.
*C08J 9/00* (2006.01)
*B22C 1/22* (2006.01)

(52) U.S. Cl.
USPC ............... 521/139; 521/81; 521/82; 521/83; 521/87; 521/88; 521/97; 521/98; 521/134

(58) Field of Classification Search
USPC ........ 521/139, 81, 82, 83, 87, 88, 97, 98, 134
See application file for complete search history.

(56) References Cited

U.S. PATENT DOCUMENTS

| 3,870,662 A | 3/1975 | Lundberg |
| 6,166,149 A | 12/2000 | Yamaguchi et al. |

(Continued)

FOREIGN PATENT DOCUMENTS

| CN | 1398916 | 2/2003 |
| CN | 1469893 | 1/2004 |

(Continued)

OTHER PUBLICATIONS

International Search Report and Written Opinion from PCT/US11/22663 dated Oct. 7, 2011.

(Continued)

*Primary Examiner* — Michael L Leonard
(74) *Attorney, Agent, or Firm* — Calfee, Halter & Griswold LLP

(57) ABSTRACT

Polymeric foam and polymeric foam products that contain a foamable polymer material, at least one blowing agent, an infrared attenuating agent, and a polystyrene/polyethylene oxide copolymer are provided. In exemplary embodiments, the blowing agent contains an HFC. The maleic anhydride-styrene copolymer grafted with polyethylene oxide increases the cell size of the polymer foam and offsets or even negates the decreased cell size caused by an HFC blowing agent and/or infrared attenuating agents. In addition, the copolymer of maleic anhydride-styrene grafted with polyethylene oxide has a positive affect on the processability of the blowing agent(s) in the composition by both widening the process window and enhancing the solubility of the blowing agent in the polymer melt. Thus, the polystyrene/polyethylene oxide copolymer present in the inventive composition acts as a cell enlarger, a plasticizer, and a processing aid. A method of forming an extruded foam product is also provided.

13 Claims, 10 Drawing Sheets

Effect of PEO Additive on Average Cell Sizes

(56) References Cited

U.S. PATENT DOCUMENTS

| | | | |
|---|---|---|---|
| 6,406,143 | B1 | 6/2002 | Chen et al. |
| 6,787,580 | B2 | 9/2004 | Chonde et al. |
| 8,323,787 | B2 | 12/2012 | Dealviz et al. |
| 8,349,909 | B2 | 1/2013 | Delaviz et al. |
| 8,378,001 | B2 | 2/2013 | Delaviz et al. |
| 2003/0022990 | A1 | 1/2003 | Hirota et al. |
| 2008/0242752 | A1 | 10/2008 | Delaviz et al. |
| 2011/0189461 | A1 | 8/2011 | Delaviz et al. |
| 2011/0190405 | A1 | 8/2011 | Delaviz et al. |
| 2011/0196054 | A1 | 8/2011 | Delaviz et al. |

FOREIGN PATENT DOCUMENTS

| | | |
|---|---|---|
| WO | 2011/094372 | 8/2011 |
| WO | 2011/094373 | 8/2011 |
| WO | 2011/162833 | 12/2011 |

OTHER PUBLICATIONS

International Search Report and Written Opinion from PCT/US11/22666 dated Oct. 7, 2011.
International Search Report and Written Opinion from PCT/US11/22664 dated Feb. 3, 2012.
Office action from U.S. Appl. No. 12/696,716 dated Jan. 13, 2012.
Office action from U.S. Appl. No. 12/696,716 daetd Jun. 25, 2012.
Notice of Allowance from U.S. Appl. No. 12/696,716 dated Oct. 4, 2012.
Office action from U.S. Appl. No. 12/696,634 dated May 3, 2012.
Notice of Allowance from U.S. Appl. No. 12/696,634 dated Sep. 6, 2012.
Office action from U.S. Appl. No. 12/696,553 dated May 30, 2012.
Notice of Allowance from U.S. Appl. No. 12/696,553 dated Sep. 21, 2012.
Office action from Mexican Application No. 12/08756 dated Jun. 26, 2013 along with English translation of relevant portions of action.
Office action from Chinese Application No. 20118011446.9 dated Sep. 4, 2013.
Office action from Chinese Application No. 201180011447.3 dated Apr. 22, 2013.
Office action from Chinese Application No. 201180011450.5 dated Apr. 22, 2013.
Office action from U.S. Appl. No. 13/769,647 dated Oct. 15, 2013.
Office action from Chinese Application No. 201180011447.3 dated Nov. 15, 2013.
Office action from Chinese Application No. 201180011450.5 dated Nov. 15, 2013.
Office action from Chinese Application No. 201180011446.9 dated Mar. 19, 2014.
Notice of Allowance from U.S. Appl. No. 13/769,647 dated Mar. 3, 2014.
Office action from Mexican Application Serial No. 12/08756 dated Dec. 11, 2013 received on Feb. 12, 2014 along with English translation of relevant portions of action.
Office action from Mexican Application Serial No. 12/08758 dated Nov. 27, 2013 received on Feb. 12, 2014 along with English translation of relevant portions of action.

POLYSTYRENE/POLYETHYLENE OXIDE COPOLYMER CELL SIZE ENLARGER FOR FOAM

This application is a divisional application of U.S. patent application Ser. No. 12/696,553, filed Jan. 29, 2010, which has issued as U.S. Pat. No. 8,349,909.

TECHNICAL FIELD AND INDUSTRIAL APPLICABILITY OF THE INVENTION

The present invention relates generally to extruded foam products, and more particularly, to a polystyrene foam containing a copolymer of grafted maleic anhydride-styrene with polyethylene oxide where the polymer foams that have an enlarged average cell size and possess no ozone depleting potential and a low global warming potential. A method of forming such polymer foams is also provided.

BACKGROUND OF THE INVENTION

Foamed resinous structures are useful in a wide variety of applications such as thermal insulation, in cushions, as packaging, and as adsorbents. Extruded foams are generally made by melting a polymer together with any desired additives to create a polymer melt. A blowing agent is mixed with the polymer melt at an appropriate temperature and pressure to produce a foamable gel mixture. The foamable gel mixture is then cooled and extruded into a zone of reduced pressure, which results in a foaming of the gel and the formation of the desired extruded foam product. As will be appreciated, the relative quantities of the polymer(s), blowing agent(s), and additives, as well as the temperature and manner in which the pressure is reduced will tend to affect the qualities and properties of the resulting foam product.

Traditional blowing agents used for extruded foam products include chlorofluorocarbons (CFCs) and hydrochlorofluorocarbons (HCFCs). One of the advantages of both CFC and HCFC blowing agents is their high solubility in a polymer melt during the manufacturing process. Higher blowing agent solubility promotes a reduction in viscosity when the blowing agent is mixed with the polymer melt. In turn, lower viscosity leads to lower energy requirements for mixing. On the other hand, a major disadvantage to these traditional blowing agents is that an increasing number of governments worldwide have mandated the elimination of CFC and HCFC blowing agents due to growing environmental concerns. CFCs, and many other halocarbons, have come to be recognized as serious global environmental threats due to their ability to cause stratospheric ozone depletion and global warming. The ozone depletion and global warming impact of chemicals such as CFCs and HCFCs are measured by the ozone depletion potential (ODP) and global warming potential (GWP) respectively.

In view of the mandatory phase out of blowing agents with a high ODP and a high GWP, there has been a movement to replace the conventional blowing agents with more environmentally friendly blowing agents, such as hydrofluorocarbons (HFCs) and $CO_2$, in insulating foam applications. Although HCFCs provide a superior thermal barrier compared to HFC and $CO_2$, the chlorine present in the HCFCs possesses an ozone depletion potential. Additionally, over time, the chlorofluorocarbon gas phase remaining in the foam is released into the atmosphere, thereby reducing the insulative value of the foam and potentially further contributing to the global warming potential. In addition, each of the "non-conventional" blowing agents leads to a different cell size and morphology, depending on the particular blowing agent chosen. Additionally, the cell sizes of the foams produced by these generally environmentally friendly blowing agents are too small to provide an acceptable insulative value to the foamed product and generally results in a higher density and a more costly product. For instance, HFC-134a is much less soluble in a polystyrene melt than HCFC-142b and HFC-134a produces foams with a small cell size, which creates difficulty in processing compared to HCFC-142b.

To reduce thermal conductivity and increase the insulative value of the foamed product, infrared attenuating agents (IAAs) such as carbon black, powdered amorphous carbon, graphite, and titanium dioxide have been used as fillers in polymeric foam products. However, the inclusion of infrared attenuating agents in the foamable composition in combination with HFC blowing agents tends to increase the melt rheology and decrease the cell size of the foam product. Additionally, an undesirable high die pressure is required when such infrared attenuating agents and HFC blowing agents are present.

Despite previous attempts to reduce the ODP and GWP, there remains a need in the art to achieve an extruded polymer foam that has an increased cell size when non-HCFC blowing agents are used, that maintains the positive physical properties of conventional extruded polystyrene foams, that provides a foam product with increased insulation value (R-value), and that meets the stringent requirements for a reduction in the global warming potential and ozone depletion potential

SUMMARY OF THE INVENTION

It is an object of the present invention to provide a composition for forming a closed cell, rigid thermoplastic polymer foam that includes a foamable polymer material, at least one blowing agent, an infrared attenuating agent, and a copolymer of grafted maleic anhydride-styrene with polyethylene oxide. The blowing agent may be selected from hydrofluorocarbons, $C_1$ to $C_9$ aliphatic hydrocarbons, $C_1$ to $C_3$ aliphatic alcohols, carbon dioxide, acetone, natural gases, air, water, ketones, ethers, methyl formate, hydrogen peroxide, and combinations thereof. The infrared attenuating agent may be selected from nanographite, carbon black, activated carbon, powdered amorphous carbon, asphalt, granulated asphalt, milled glass, fiber glass strands, mica, black iron oxide, metal flakes, carbon nanotube, nanographene platelets, carbon nanofiber, activated carbon, titanium dioxide, and combinations thereof. The copolymer of grafted maleic anhydride-styrene with polyethylene oxide enhances the miscibility and use of polyethylene oxide as a cell size enlarging agent. In addition, the polystyrene/polyethylene oxide copolymer provides a vehicle to incorporate polyethylene oxide into the polymer matrix/melt during the extrusion process. Further, the copolymer of grafted maleic anhydride-styrene with polyethylene oxide enhances the solubility of HFC in the polymer melt. In exemplary embodiments, the foamable polymer material includes polystyrene, the blowing agent includes an HFC blowing agent, and the infrared attenuating agent includes nanographite. The copolymer of grafted maleic anhydride-styrene with polyethylene oxide has the formula depicted in Formula I:

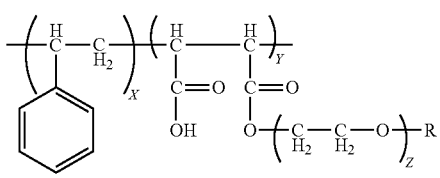

Formula I where X=100 to 2,500; Y=20 to 500; Z=5 to 50 and R=$C_1$ to $C_{25}$.

It is also an object of the present invention to provide a foamed product that includes an extruded foamable composition comprising a foamable polymer material, at least one blowing agent, one or more infrared attenuating agent, and a copolymer of grafted maleic anhydride-styrene with polyethylene oxide. The polyethylene oxide grafted maleic anhydride-styrene copolymer has the chemical structure set forth in Formula I above. The polyethylene oxide grafted maleic anhydride-styrene copolymer increases the cell size of the foamed product without detrimentally affecting the physical or thermal properties of the foamed product. Additionally, the polystyrene/polyethylene oxide copolymer provides a cell size from about 0.1 mm to about 0.2 mm in the polymer foam product. In exemplary embodiments, the foamable polymer material includes polystyrene, the blowing agent includes an HFC blowing agent, and the infrared attenuating agent includes nanographite.

It is another object of the present invention to provide a method of forming a rigid, closed cell foam product that includes heating an alkenyl aromatic polymer material, an infrared attenuating agent, and a polyethylene oxide grafted maleic anhydride-styrene copolymer to a first temperature sufficient to melt the polymer material and form a polymer melt, incorporating at least one blowing agent into the polymer melt at a first pressure to form a foamable gel, cooling the foamable gel to a second temperature where the second temperature is less than the first temperature, and extruding the cooled polymer melt at a pressure sufficient to form a rigid, closed cell extruded foam product. The polyethylene oxide grafted maleic anhydride-styrene copolymer has the chemical structure set forth in Formula I above. The method may also include compounding the polystyrene/polyethylene oxide copolymer in a carrier, pelletizing the compounded polystyrene/polyethylene oxide to form a pellet, and adding the pellet to the polymer melt. In addition, the polystyrene/polyethylene oxide copolymer is a carrier to incorporate polyethylene oxide into the polymer melt. The polystyrene/polyethylene oxide copolymer provides a cell size from about 0.1 mm to about 0.2 mm and an R-value from 5.0-7.0 in the extruded foam product.

It is an advantage of the present invention that the polyethylene oxide increases the average cell size of the foamed product without detrimentally affecting the physical or thermal properties of the product.

It is another advantage of the present invention that the composition of the present invention has a low global warming potential and little or no ozone depleting potential.

It is yet another advantage of the present invention that the inclusion of the polystyrene/polyethylene copolymer in the foamable composition requires no modification to existing manufacturing equipment and therefore no increase in manufacturing costs.

It is a further advantage of the present invention that the foams produced by the present composition have no toxicity to living creatures.

It is yet another advantage of the present invention that the polystyrene/polyethylene oxide copolymer provides a cell size from about 0.10 mm to about 0.20 mm and an R-value/inch from about 5.0 to 7.0 in the extruded foam product.

It is also an advantage of the present invention that the copolymer of grafted maleic anhydride-styrene with polyethylene oxide enhances the miscibility and use of polyethylene oxide as a cell size enlarging agent.

It is another advantage of the present invention that the polystyrene/polyethylene oxide copolymer is a source for the incorporation of tertiary materials that are generally not compatible with the base polymer into the polymer melt.

It is another feature of the present invention that the foamable polymer material is an alkenyl aromatic polymer material.

It is yet another feature of the present invention that grafting polyethylene oxide to a styrene-maleic anhydride copolymer overcomes the incompatibility of polystyrene and polyethylene oxide.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
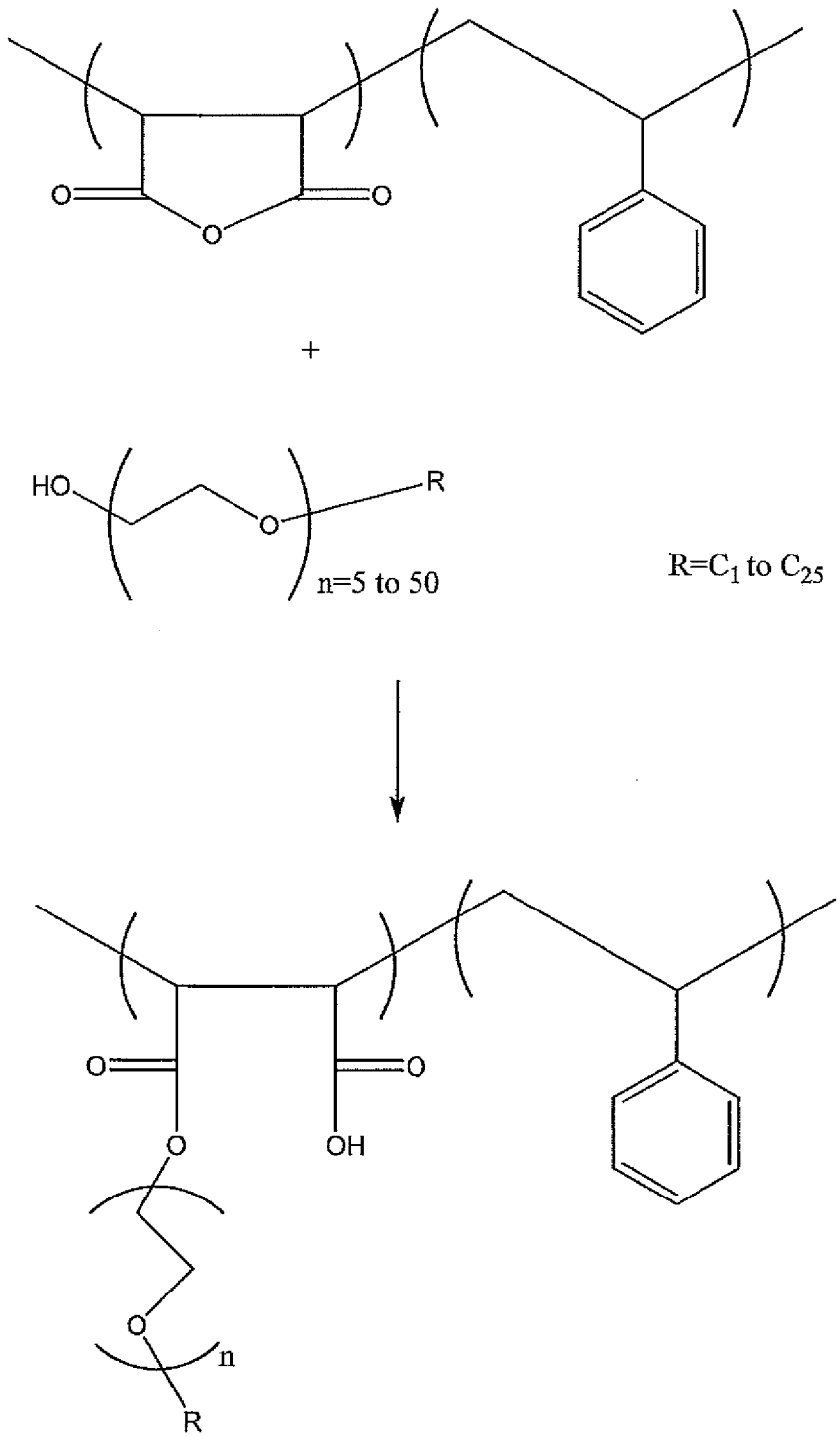
FIG. 1 is an illustration of the reaction of styrene-maleic anhydride copolymer with an alcohol ethoxylate according to at least one exemplary embodiment of the invention.
Figure 2:
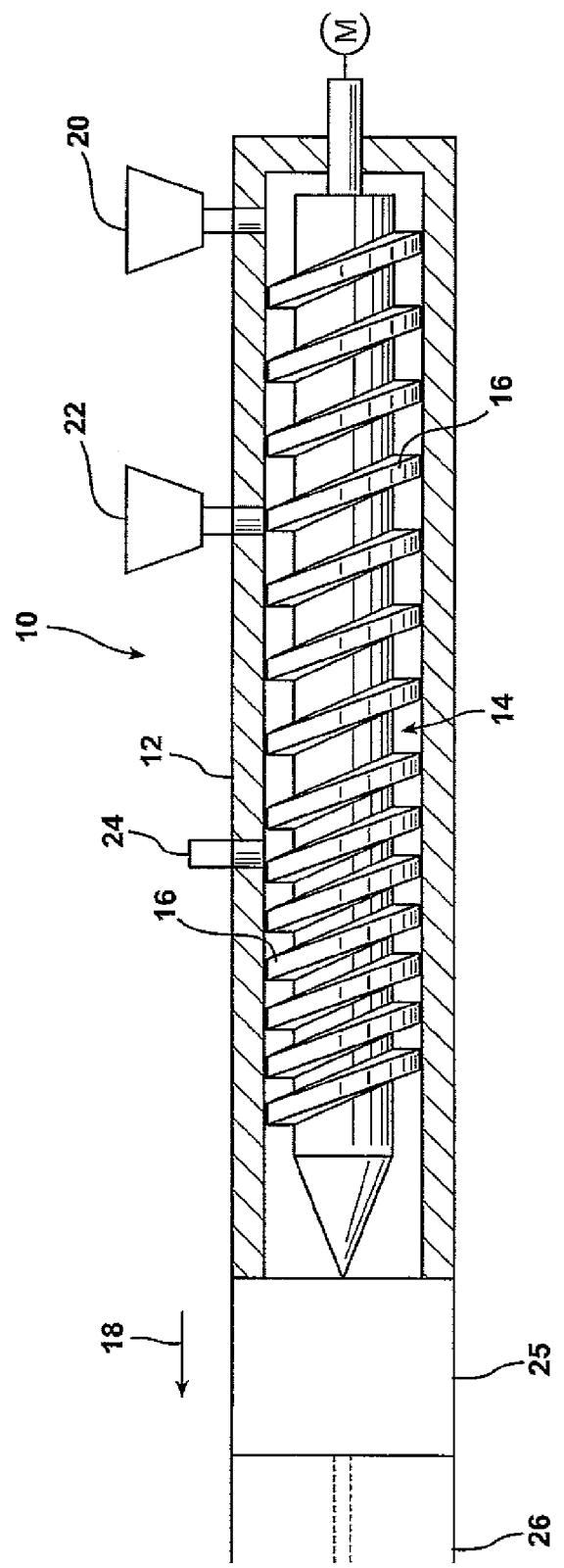
FIG. 2 is a schematic illustration of an extrusion apparatus for forming an extruded foam according to at least one exemplary embodiment of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements.

The terms "composition" and "inventive composition" may be used interchangeably herein. In addition, the terms "increased average cell size" and "enlarged average cell size" may be used interchangeably herein. Further "maleic anhydride-styrene copolymer grafted with polyethylene oxide", "copolymer of maleic anhydride-styrene grafted with polyethylene oxide", and "polystyrene/polyethylene oxide copolymer" may be interchangeably used within this application.

The present invention relates to polymer extruded or expanded foams that contain a polystyrene/polyethylene oxide copolymer as a cell size enlarging agent that increases the average cell size of the foamed product. The cell size enlarging agent increases the average cell size of the foamed product without detrimentally affecting the physical or thermal properties of the product formed. The composition used to form the expanded foams having an increased cell size includes a foamable polymer material, at least one blowing agent (e.g., hydrofluorocarbon (HFC)), an infrared attenuating agent (e.g., nanographite), and a polystyrene/polyethylene oxide copolymer. The copolymer of grafted maleic anhydride-styrene with polyethylene oxide enhances the miscibility and use of polyethylene oxide as a cell size enlarging agent. In addition, the polystyrene/polyethylene oxide copolymer acts as a process aid and a plasticizer, enhances the solubility of the blowing agent, and lowers the die pressure.

The foamable polymer material is the backbone of the formulation and provides strength, flexibility, toughness, and durability to the final product. The foamable polymer material is not particularly limited, and generally, any polymer capable of being foamed may be used as the foamable polymer in the resin mixture. The foamable polymer material may be thermoplastic or thermoset. The particular polymer material may be selected to provide sufficient mechanical strength and/or to the process utilized to form final foamed polymer products. In addition, the foamable polymer material is preferably chemically stable, i.e., generally non-reactive, within the expected temperature range during formation and subsequent use in a polymeric foam. Non-limiting examples of suitable foamable polymer materials include alkenyl aromatic polymers, polyvinyl chloride (PVC), chlorinated polyvinyl chloride (CPVC), polyethylene, polypropylene, polycarbonates, polyisocyanurates, polyetherimides, polyamides, polyesters, polycarbonates, polymethylmethacrylate, polyphenylene oxide, polyurethanes, phenolics, polyolefins, styreneacrylonitrile, acrylonitrile butadiene styrene, acrylic/styrene/acrylonitrile block terpolymer (ASA), polysulfone, polyurethane, polyphenylenesulfide, acetal resins, polyamides, polyaramides, polyimides, polyacrylic acid esters, copolymers of ethylene and propylene, copolymers of styrene and butadiene, copolymers of vinylacetate and ethylene, rubber modified polymers, thermoplastic polymer blends, and combinations thereof.

In one exemplary embodiment, the foamable polymer material is an alkenyl aromatic polymer material. Suitable alkenyl aromatic polymer materials include alkenyl aromatic homopolymers and copolymers of alkenyl aromatic compounds and copolymerizable ethylenically unsaturated comonomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer. Notwithstanding the components of the composition, the alkenyl aromatic polymer material may include greater than 50 or greater than 70 weight percent alkenyl aromatic monomeric units. In at least one embodiment of the invention, the alkenyl aromatic polymer material is formed entirely of alkenyl aromatic monomeric units.

Examples of alkenyl aromatic polymers include, but are not limited to, those alkenyl aromatic polymers derived from alkenyl aromatic compounds such as styrene, α-methylstyrene, ethylstyrene, vinyl benzene, vinyl toluene, chlorostyrene, and bromostyrene. In at least one embodiment, the alkenyl aromatic polymer is polystyrene.

Minor amounts of monoethylenically unsaturated compounds such as $C_2$ to $C_6$ alkyl acids and esters, ionomeric derivatives, and $C_2$ to $C_6$ dienes may be copolymerized with alkenyl aromatic compounds. Non-limiting examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

The foamed products may be formed substantially of (e.g., greater than 95 percent), and in most embodiments, formed entirely of polystyrene. The foamable polymer material may be present in the composition in an amount from about 0.5% to about 5.0% by weight, in an amount from about 1.0% to about 3.0% by weight, or in an amount of about 1.5% to about 3.0% by weight. As used herein, the term "% by weight" is meant to indicate a percentage based on 100% of the total weight of the dry components.

It is to be appreciated that the properties of the extruded foam or foam product may be modified by the selection of the molecular weight of the polymer. For example, the preparation of lower density extruded foam products is facilitated by using lower molecular weight polymers. On the other hand, the preparation of higher density extruded foam products is facilitated by the use of higher molecular weight polymers or higher viscosity resins.

The foamable composition may include at least one hydrofluorocarbon (HFC) blowing agent. The specific hydrofluorocarbon utilized is not particularly limited. A non-exhaustive list of examples of suitable blowing HFC blowing agents include 1,1-difluoroethane (HFC-152a), 1,1,1,2-tetrafluoroethane (HFC-134a), 1,1,2,2-tetrafluoroethane (HFC-134), 1,1,1-trifluoroethane (HFC-143a), difluoromethane (HFC-32), 1,3,3,3-pentafluoropropane (HFC-1234ze), pentafluoro-ethane (HFC-125), fluoroethane (HFC-161), 1,1,2,2,3,3-hexafluoropropane (HFC 236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245ca), 1,1,2,3,3-pentafluoropropane (HFC-245ea), 1,1,1,2,3 pentafluoropropane (HFC-245eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof.

Other blowing agents useful in the practice of this invention include inorganic blowing agents, organic blowing agents, and chemical blowing agents. Any suitable blowing agent may be used in the practice on this invention as a blowing agent. However, due to increased environmental concern over global warming and ozone depletion, it is desirable to use blowing agents free of chlorofluorocarbons (CFCs).

Non-limiting examples of organic blowing agents suitable for use in the present invention include $C_2$ to $C_9$ aliphatic hydrocarbons (e.g., methane, ethane, propane, n-butane, cyclopentane, isobutane, n-pentane, isopentane, and neopentane), $C_1$ to $C_5$ aliphatic and non-aliphatic alcohols (e.g., methanol, ethanol, n-propanol, isopropanol, and butanol). Natural gases such as carbon dioxide ($CO_2$), nitrogen ($N_2$), and/or argon (Ar) may also be used as a blowing agent. Water, air, ketones (e.g., acetone and methyl ethyl ketone), ethers (e.g., dimethyl ethers and diethyl ethers), methyl formate, acetone, and hydrogen peroxide may also be used as blowing agents. The blowing agents identified herein may be used singly or in combination. In exemplary embodiments, the blowing agent includes at least one hydrofluorocarbon (HFC) blowing agent. The blowing agent may be present in the composition in an amount from about 5.0% to about 10.0% by weight, and in exemplary embodiments, from about 7.0% to about 8.0% by weight. The blowing agent utilized in the inventive composition is selected such that the composition has zero ozone depletion and low to no global warming potential. In at least one exemplary embodiment, the blowing agent is 1,1-difluoroethane (HFC-152a), 1,1,1,2-tetrafluoroethane (HFC-134a), or a combination of 1,1-difluoroethane (HFC-152a) and 1,1,1,2-tetrafluoroethane (HFC-134a).

As discussed above, the composition also contains at least one infrared attenuating agent to increase the R-value of the foam product. Hydrofluorocarbon blowing agents, while environmentally friendly, tend to decrease the R-value of the foam product compared to a conventional HCFC foamed product (e.g., R-value per inch of 5.0) at comparable densities. As taught in U.S. Patent Publication Number 2008/0242752 to Delaviz, et al., which is incorporated herein by reference in its entirety, it was discovered that the addition of low levels of an infrared attenuating agent to a foamable composition containing a hydrofluorocarbon blowing agent increased the R-value of the foam to an amount comparable to, or better than, a foam produced with an HCFC blowing agent (e.g., 1-chloro-1,1-difluoroethane (HCFC-142b)).

It was also discovered that, generally, foams produced with an infrared attenuating agent and a hydrofluorocarbon blowing agent had an R-value per inch of 5.0. Non-limiting examples of suitable infrared attenuating agents for use in the present composition include nanographite, carbon black, powdered amorphous carbon, asphalt, granulated asphalt, milled glass, fiber glass strands, mica, black iron oxide, metal flakes (e.g., aluminum flakes), carbon nanotube, nanographene platelets, carbon nanofiber, activated carbon, titanium dioxide, and combinations thereof. In exemplary embodiments, the infrared attenuating agent is present in the foam composition in an amount from about 0.10% to about 0.5% by weight of the total dry components of the composition. In other embodiments, the infrared attenuating agent may be present in an amount from about 0.01% to about 10.0% by weight.

Although the infrared attenuating agent increases the R-value for foams that include hydrofluorocarbon blowing agents, the addition of infrared attenuating agents also tends to decrease the cell size of the cells in the foam, which results in undesirable final foamed products. In particular, small cell sizes tend to increase board bulk density, increase product cost, and reduce the process window during the extrusion process. Further, infrared attenuating agents undesirably increase the melt rheology, which will result in an increase of the die pressure.

To compensate for the decreased cell size caused by the infrared attenuating agent and the blowing agent (e.g., HFC-134a and/or HFC-152a and/or $CO_2$), a polyethylene oxide grafted maleic anhydride-styrene copolymer having the chemical structure set forth in Formula I is included in the composition.

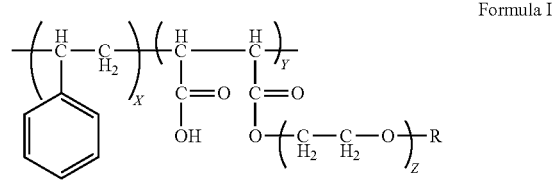

Formula I where X=100 to 2,500; Y=20 to 500; Z=5 to 50 and R=$C_1$ to $C_{25}$.

Functionally, the polystyrene/polyethylene oxide copolymer is much more compatible with the base polymer than polyethylene oxide alone. As a result, the polystyrene/polyethylene oxide copolymer provides a vehicle to easily incorporate polyethylene oxide into the polymer matrix/melt. Additionally, the copolymer of styrene with polyethylene oxide provides a medium for the incorporation of other (e.g., tertiary) materials that are not generally compatible with the base polymer into the polymer melt. Thus, it is envisioned that the polystyrene/polyethylene oxide copolymer can be a carrier for other incompatible materials into the polymer melt, as long as they be copolymerized. It is to be appreciated that these concepts can be expanded to other thermoplastic as well as thermoset foams. It is also to be appreciated that although this application is directed to polystyrene/polyethylene oxide copolymers and reference is made herein to polystyrene/polyethylene oxide copolymers, the reaction shown in FIG. 1 can be expanded to incorporate other copolymerizable cell size enlarging agents, such as, for example, ethylene-vinyl acetate-vinyl alcohol copolymers or waxes.

It has been discovered that the polystyrene/polyethylene oxide copolymer depicted in Formula I increases the cell size of the polymer foam and offsets or even negates the decreased cell size caused by the HFC blowing agent and/or the infrared attenuating agents. In addition, the copolymer of grafted maleic anhydride-styrene with polyethylene oxide has a positive affect on the processability of the HFC blowing agent(s) in the composition by both widening the process window and enhancing the HFC solubility in the polymer melt. Also, the copolymer of polystyrene and polyethylene oxide enhances the miscibility and use of polyethylene oxide as a cell size enlarging agent. Thus, the polystyrene/polyethylene oxide copolymer present in the inventive composition acts as a cell enlarger, a plasticizer, and a processing aid. Further, the polyethylene oxide moieties add polarity to the polymer melt and help to improve the solubility of HFC blowing agents (e.g., HFC-134a, HFC-152a, and $CO_2$). Due to the plasticizing effect of the polystyrene/polyethylene oxide copolymer, free volume is created in the melt, which results in higher blowing agent solubility and a lowering of the melt viscosity.

The polystyrene/polyethylene oxide copolymer may be added to the composition in an amount from about 1.0% to about 15.0% by weight, particularly from about 2.0% to about 12.0% by weight, and in exemplary embodiments, from about from 4.0% to about 12% by weight of the total dry components of the composition.

The use of the polystyrene/polyethylene oxide copolymer in conjunction with the infrared attenuating agent permits the formation of a foam with an optimized cell size and a high insulation value (R-value) and to optimize the physical properties of the final foamed product. In addition, the polystyrene/polyethylene oxide copolymer provides an increased cell size to the foamed product without detracting from the physical and thermal properties the foam. It is believed that the blowing agent(s) and the infrared attenuating agent(s) have a synergistic affect on the cell morphology and decrease in cell size that is surprisingly overcome by the addition of the copolymer of polystyrene and polyethylene oxide.

Further, the inventive composition may contain a fire retarding agent in an amount up to about 1.0% by weight. For example, fire retardant chemicals may be added in the extruded foam manufacturing process to impart fire retardant characteristics to the extruded foam products. Preferably, the fire retarding agent is added to the foamable gel, which is described below with respect to the formation of the inventive foam. Non-limiting examples of suitable fire retardant chemicals for use in the inventive composition include brominated aliphatic compounds such as hexabromocyclododecane and pentabromocyclohexane, brominated phenyl ethers, esters of tetrabromophthalic acid, and combinations thereof.

Optional additives such as nucleating agents, plasticizing agents, pigments, elastomers, extrusion aids, antioxidants, fillers, antistatic agents, biocides, and/or UV absorbers may be incorporated into the inventive composition. These optional additives may be included in amounts necessary to obtain desired characteristics of the foamable gel or resultant extruded foam products. The additives may be added to the polymer mixture or they may be incorporated in the polymer mixture before, during, or after the polymerization process used to make the polymer.

To form an alkenyl aromatic polymer foam according to the principles of the instant invention, the foamable polymer material (e.g., polystyrene) may be heated to a temperature at or above the polymer's glass transition temperature or melting point to form a plasticized or a melt polymer material. The infrared attenuating agent (e.g., nanographite) may be blended in the polymer melt or dry blended with the polymer material prior to plasticizing or melting the foamable polymer material. It is to be appreciated that nanographite may also be added directly as a powder, in a compact form, or in a slurry. The copolymer of polystyrene and polyethylene oxide is a high viscose liquid and/or wax at room temperature. Accordingly, it can be compounded in a carrier such as polystyrene, pelletized, and added to the polymer melt, such as is demonstrated in the examples below. Alternatively, the polystyrene/polyethylene oxide copolymer can be added directly, may use other carriers/polymers, or be dissolved in a solvent such as alcohol and added to the extrusion as a liquid using a pump.

One or more blowing agents (e.g., 1,1-difluoroethane (HFC-152a) and/or 1,1,1,2-tetrafluoroethane (HFC-134a)) is incorporated or mixed into the melt polymer material by any conventional method known to those of skill in the art such as, for example, with an extruder, a mixer, or a blender. As the blowing agent is added to the polymer melt, the blowing agent becomes soluble, i.e. dissolves, in the polymer melt and forms a foamable gel. Additionally, the blowing agent may be mixed with the melt polymer material at an elevated pressure sufficient to prevent substantial expansion of the melt polymer material and to generally disperse the blowing agent(s) substantially homogeneously or heterogeneously in the melt polymer material.

The foamable gel may then be cooled to a die melt temperature. The die melt temperature is typically cooler than the melt mix temperature to optimize the physical characteristics of the foamed product. In addition, that the die pressure may be sufficient to prevent, or at least minimize, pre-foaming of the foamable gel. Pre-foaming is the undesirable premature foaming of the foamable gel before extrusion of the gel into a region of reduced pressure. Thus, the die pressure varies depending upon the identity and amount of blowing agent(s) present in the foamable gel. The foamable gel may then be extruded through a die having a desired shape to a zone of lower or reduced pressure to form the desired foamed structure or foamed product. The zone of lower pressure is at a pressure lower than that in which the foamable gel is maintained prior to extrusion through the die. The lower pressure may be superatmospheric or subatmospheric (i.e., a vacuum), but in most embodiments, it is at atmospheric level. The foam thus produced is a rigid, closed cell, polymer foam.

A screw extruder for use in the present invention is generally indicated at reference numeral 10 in FIG. 1. The screw extruder for use in the instant invention may equally be a single screw or twin screw extruder. Reference is made herein with respect to a single screw extruder. The extruder 10 is formed of a barrel 12 and at least one screw 14 that extends substantially along the length of the barrel 12. A motor (M) may be used to power the screw 14. The screw 14 contains helical flights 16 rotating in the direction of arrow 18. The flights 16 of the screw 14 cooperate with the cylindrical inner surface of the barrel 12 to define a passage for the advancement of the resin and reinforcement fibers through the barrel 12. The foamable polymer material may be fed into the screw extruder 10 as flowable solid, such as beads, granules, or pellets from one or more feed hoppers 20.

As the foamable polymer material flows through the extruder 10 in the direction of arrow 18, the spacing between the flights 16 of the screw 14 decreases. Thus, the volume between the flights 16 decreases as the polymer melt flows downstream. The term "downstream" as used herein refers to the direction of resin and fiber flow through the barrel 12. This decreasing volume, together with the mechanical action and friction generated from the barrel 12 and the screw 14, causes the foamable polymer material to melt and form the melt polymer material.

It is to be appreciated that the flights 16 of the screw 14 cooperate with the cylindrical inner surface of the barrel 12 to define a passage for the advancement of the polymer melt through the barrel 12. As shown in FIG. 1, ports are provided at designated positions on the extruder for the insertion of the infrared attenuating agent and the polystyrene/polyethylene oxide copolymer and for the injection of the blowing agent(s). Specifically, a hopper 22 is provided downstream of the feed hopper 20 to feed the infrared attenuating agent into the barrel 12. The infrared attenuating agent and the polystyrene/polyethylene oxide copolymer are mixed into the polymer melt by the rotation of the screw 14. It is to be noted, however, that other ports and/or hoppers may be present on the barrel 12 for the inclusion of other materials or additives, such as, but not limited to, flame retardants, nucleating agents (e.g., talc), biocides, plasticizing agents, pigments, elastomers, extrusion aids, antioxidants, fillers, and/or antistatic agents.

In at least one embodiment, the resin and the polystyrene/polyethylene oxide copolymer are substantially simultaneously fed into the barrel 12 of the extruder 10 through feed hopper 22. As used herein, the term "substantially simultaneously fed" is meant to indicate that the polymer resin and the maleic anhydride-styrene copolymer grafted with polyethylene oxide are fed into the barrel 12 at the same time or at nearly the same time.

Once the infrared attenuating agent, blowing agent(s), and polystyrene/polyethylene oxide copolymer have been introduced into the barrel 12, the resulting foamable mixture is subjected to additional blending to substantially uniformly distribute the infrared attenuating agent, blowing agent, and maleic anhydride-styrene copolymer grafted with polyethylene oxide throughout the foamable mixture.

The heat from the internal friction from the screw 14 within the barrel 12 causes the blowing agent to be uniformly or substantially uniformly dispersed for improved solubility. The foamable mixtures is subsequently cooled to a lower temperature in a melt cooler 25 and then conveyed from the extruder 10 through an extrusion die 26 which is designed to shape the foam into a desired shape and to create a pressure drop which permits the blowing agent to expand and develop a foamed cell structure in the form of a foam layer or slab. This area of reduced pressure within the extrusion die may be at or below atmospheric pressure (i.e., a vacuum). The polymeric foam may be subjected to additional processing such as calendaring, water immersion, cooling sprays, or other operations to control the thickness and other properties of the resulting foam product.

The foam composition produces rigid, closed cell, polymer foam boards prepared by an extruding process. Extruded foams have a cellular structure with cells defined by cell membranes and struts. Struts are formed at the intersection of the cell membranes, with the cell membranes covering interconnecting cellular windows between the struts. In the present invention, the inventive composition produces substantially closed cellular foams with an average density of about 1.5 lbs/ft$^3$ to about 3.0 lbs/ft$^3$, or from about 1.6 lbs/ft$^3$ to about 2.0 lbs/ft$^3$. It is to be appreciated that the phrase "substantially closed cell" is meant to indicate that the foam contains all closed cells or nearly all of the cells in the cellular structure are closed. In most exemplary embodiments, not more than about 5.0% of the cells are open cells. The closed cell structure helps to increase the R-value of a formed, foamed insulation product. It is to be appreciated, however, that it is within the purview of the present invention to produce an open cell structure, although such an open cell structure is not an exemplary embodiment.

Additionally, the inventive foam composition produces extruded foams that have insulation values (R-values) that are equal to or better than conventional extruded foams produced with 1-chloro-1,1-difluoroethane (HCFC-142b). The R-value per inch of the inventive foams and foam products may be from 5.0 to 7.0. In at least one embodiment, the R-value per inch is from 5.0 to 6.0. In addition, the average cell size of the inventive foam and foamed products is about 0.1 mm to about 0.2 mm, or from about 0.14 mm to about 0.16 mm. In some embodiments, the average cell size is from about 0.12 mm to about 0.16 mm. The extruded inventive foam may be formed into an insulation product such as rigid insulation boards, insulation foam, packaging products, and building insulation or underground insulation (e.g., highway, airport runway, railway, and underground utility insulation).

Another aspect of the extruded inventive foams is that they possess a high level of dimensional stability. For example, the change in dimension in any direction is about 5% or less. In addition, the foam formed by the inventive composition is desirably monomodal and the cells have a relatively uniform average cell size. As used herein, the average cell size is an average of the cell sizes as determined in the X, Y and Z directions. In particular, the "X" direction is the direction of extrusion, the "Y" direction is the cross machine direction, and the "Z" direction is the thickness. In the present invention, the highest impact in cell enlargement is in the X and Y directions, which is desirable from an orientation and R-value perspective. In addition, further process modifications would permit increasing the Z-orientation to improve mechanical properties while still achieving an acceptable thermal property. The extruded inventive foam can be used to make insulation products such as rigid insulation boards, insulation foam, and packaging products.

There are numerous advantages of utilizing the composition of the present invention to form foam products. For example, the blowing agent utilized in the inventive formulation does not have a lower global warming potential than current HFC-142b and has a low or zero ozone depleting potential. In addition, the infrared attenuating agent and the maleic anhydride-styrene copolymer grafted with polyethylene oxide may be added to the melt polymer in a conventional fashion. Therefore, in at least some exemplary embodiments, there is no need to modify existing equipment or change the manufacturing lines to accommodate either the infrared attenuating agent or the maleic anhydride-styrene copolymer grafted with polyethylene oxide. In addition, the maleic anhydride-styrene copolymer grafted with polyethylene oxide is environmentally friendly and does not create any negative environmental concerns. Further, the maleic anhydride-styrene copolymer grafted with polyethylene oxide increases the average cell size of the foamed product without detrimentally affecting the physical or thermal properties of the product.

Additionally, the maleic anhydride-styrene copolymer grafted with polyethylene oxide improves the solubility of the HFC blowing agent(s) in the foamable composition. The polystyrene/polyethylene oxide copolymer acts as a plasticizer to reduce the melt viscosity and lower the extrusion pressures. Also, the presence of polyethylene oxide moieties provides polarity through the C—O—C bonds in the matrix, resulting in an improved solubility of blowing agents such as HFC-134a, HFC-152a, and $CO_2$. Additionally, through the plasticization, the polyethylene oxide moieties create free volume in the matrix, which results in higher blowing agent solubility and a lowered melt viscosity. Overall, the polystyrene/polyethylene oxide copolymer acts as process aid and, as is demonstrated in the following examples, lowers the extrusion pressure.

Having generally described this invention, a further understanding can be obtained by reference to certain specific examples illustrated below which are provided for purposes of illustration only and are not intended to be all inclusive or limiting unless otherwise specified.

EXAMPLES

Inclusion of Copolymer of Grafted Maleic Anhydride-Styrene with Polyethylene Oxide in an Extruded Polystyrene Foam Board Compositions containing polystyrene, a mixture of HFC-134a/HFC-152a as blowing agents, graphite, and a copolymer of maleic anhydride-styrene grafted with polyethylene oxide (PEO additive) as depicted in Table 1 were formed and used to generate foam board samples. In particular, graphite TG-679 (commercially available from GrafTech) was compounded at 20% active in general purpose polystyrene with the following characterics; Mw 201800, Mn 53900, Mz 407600, Mw/Mn (polydispersity) 3.4 and melt flow index of 10.7 (as determined using ASTM D1238 condition G). The PEO additive was compounded in general purpose polystyrene at 25% active. The blowing agent utilized was a 50:50 blend of HFC-134a/HFC-152a at 7.0 wt % based on the resin weight. Foam boards were formed from the composition on an Owens Corning hydrovac horizontal pilot line extrusion at a 160 kg/hour throughput rate.

TABLE 1

| Sample | Graphite (20%) % added/ actual % | PEO Additive (25%) % added/ actual % | Density (pcf) | X-cell (mm) | Y-cell (mm) | Z-cell (mm) | Ave. Cell (mm) | Orientation X:Z |
|---|---|---|---|---|---|---|---|---|
| Control 1 | 2.5/0.5 | 0/0 | 1.77 | 0.110 | 0.120 | 0.120 | 0.117 | 0.92:1 |
| 1 | 2.5/0.5 | 4.00/1.0 | 1.68 | 0.120 | 0.110 | 0.120 | 0.120 | 0.94:1 |
| 2 | 2.5/0.5 | 6.0/1.5 | 1.63 | 0.127 | 0.136 | 0.140 | 0.134 | 0.91:1 |
| 3 | 2.5/0.5 | 12.0/3.0 | 1.93 | 0.142 | 0.149 | 0.146 | 0.148 | 0.97:1 |
| 4 | 2.5/0.5 | 12.0/3.0 | 1.62 | 0.153 | 0.170 | 0.161 | 0.161 | 0.96:1 |

The following was noted and/or concluded from Table 1:

Control 1 had 0.5% actual graphite in the foamable composition. In addition, Control 1 did not contain any PEO additive. The average cell size for Control 1 was 0.117 mm.

Samples 1, 2, 3, and 4 contained the same graphite loading and increasing levels of the PEO additive as a cell enlarger. When 3.0% actual PEO additive was added as shown in Samples 3 and 4, the average cell increased to 0.146 mm and 0.161 mm respectively. It was determined that this was an approximately 38% increase in the average cell size (over the control) when 3.0% PEO additive is added. It was noted that Sample 3 had a much higher density (i.e., 1.93 pcf), and it is believed that this higher density explains why the average cell for Sample 3 was 0.148 mm, and not closer to 0.161 mm as in Example 4.

Sample 1, which contained a 1.0% PEO additive, had essentially no effect on the average cell size over the Control sample. It was noted that Sample 1 was much closer in density to Sample 4 and it was therefore believed to explain why higher levels of the PEO additive in the foamable composition acted as a cell enlarger at comparable densities.

Figure 3:
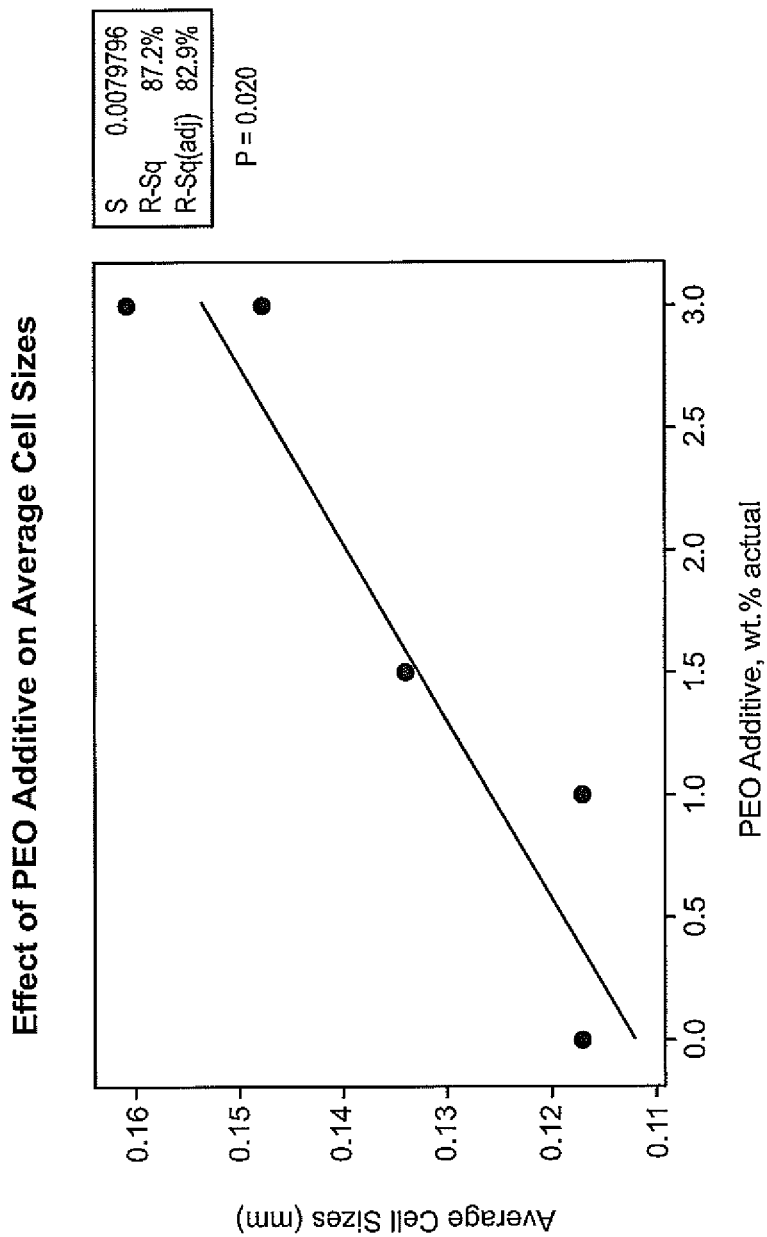
FIG. 3 is a graphical illustration of the effect of the copolymer of polyethylene oxide grafted to styrene-maleic anhydride on average cell sizes in a polystyrene foam.
Figure 4:
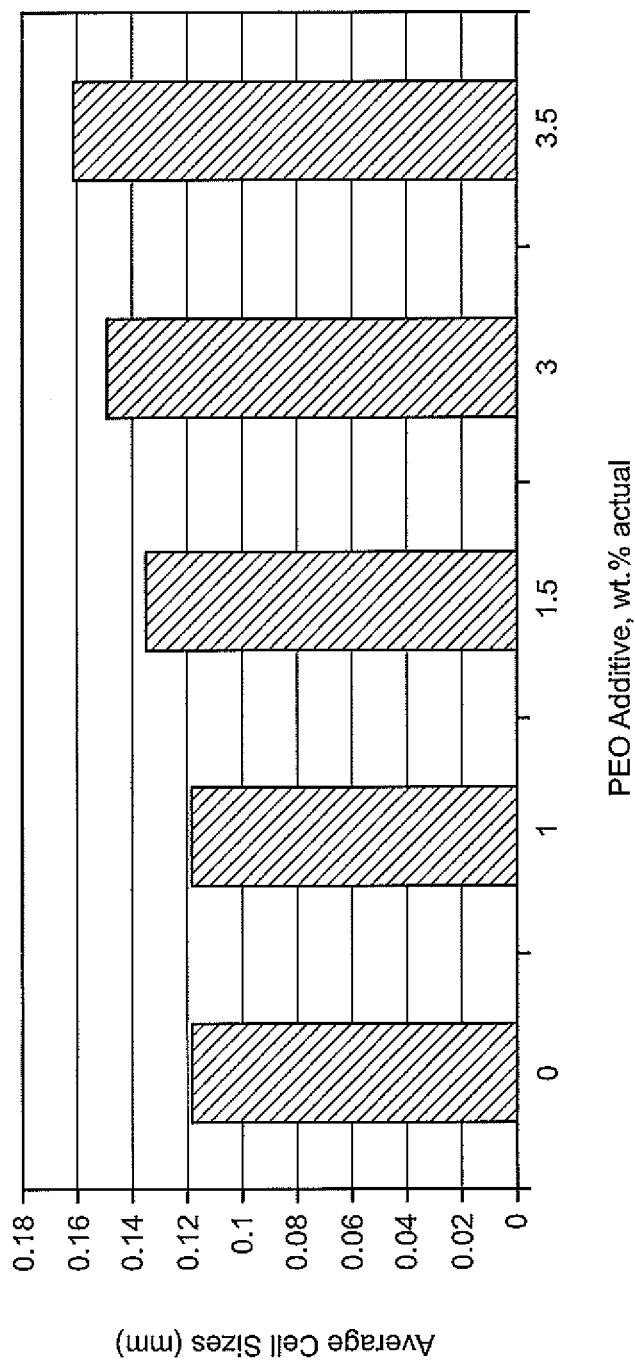
FIG. 4 is a graphical illustration of the effect of the copolymer of polyethylene oxide grafted to styrene-maleic anhydride on average cell sizes at 0.5 wt % graphite loading.

There is a larger effect of the PEO additive on the average cell sizes in the presence of 0.5 wt % graphite, as is graphically illustrated in FIGS. 3 and 4.

TABLE 2

| Sample | Graphite (20%) % added/ actual % | PEO Additive (25%) % added/ actual % | Extrusion Out (bars) | Static Mix Out (bars) | Die Pressure (bars) |
|---|---|---|---|---|---|
| Control 2 | 5.0/1.0 | 0/0 | 232.6 | 163.2 | 61.00 |
| 1 | 5.0/1.0 | 2.0/0.5 | 216.7 | 157.7 | 64.17 |
| 2 | 5.0/1.0 | 4.0/1.0 | 213.8 | 155.3 | 67.02 |
| 3 | 5.0/1.0 | 6.0/1.5 | 202.3 | 150.8 | 67.34 |

Figure 5:
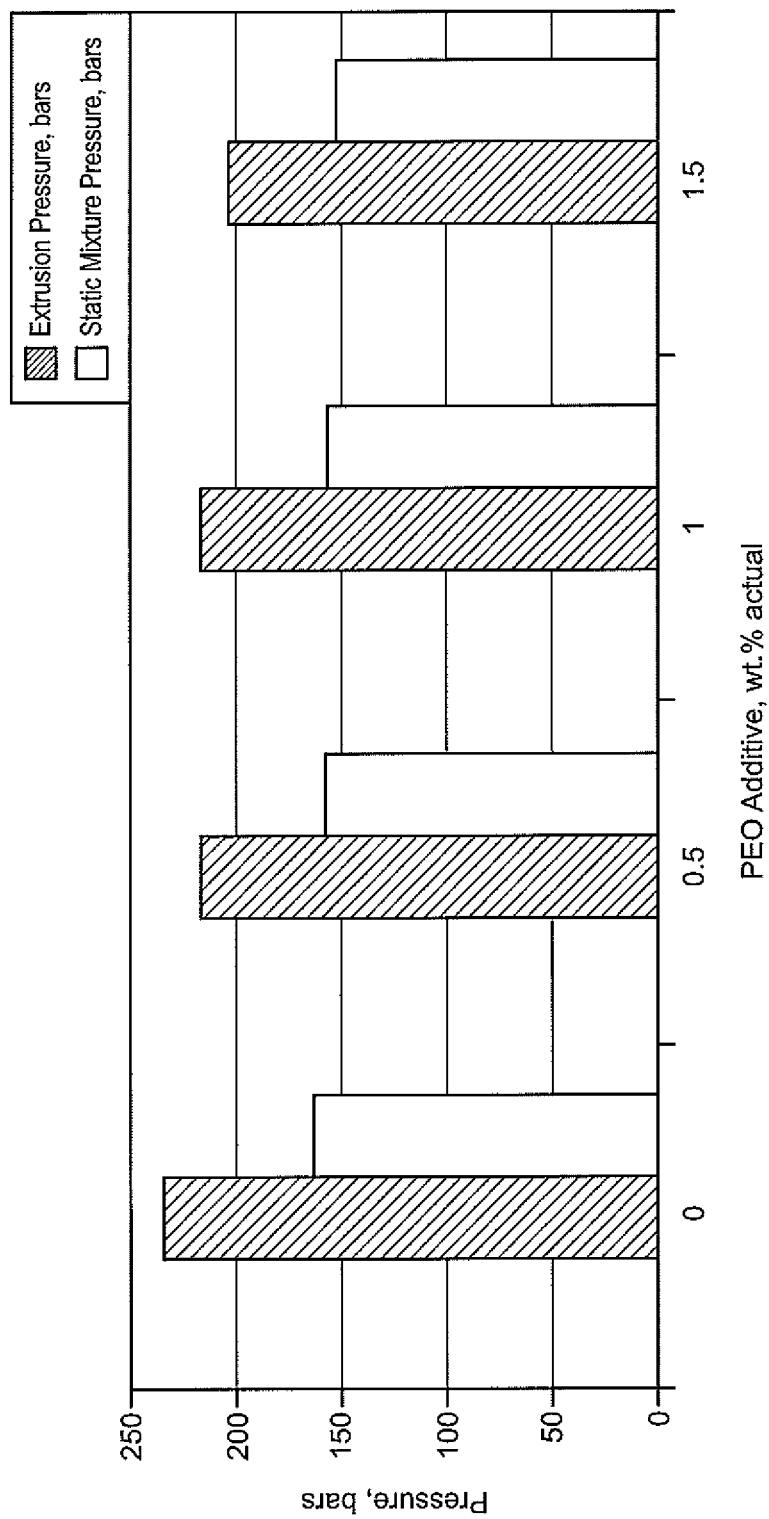
FIG. 5 is a graphical illustration of the effect of the copolymer of polyethylene oxide grafted to styrene-maleic anhydride on extrusion pressure.

The following was noted and/or concluded from Table 2:

Comparing the Control having 0% PEO additive with Sample 3 having 1.5% PEO additive, it can be seen that there is 13% and 8% reduction in extrusion and static mixture pressures, respectively. The effect of the PEO additive on extrusion pressure was more pronounced in the presence of 1.0 wt % graphite as shown in Table 2 and illustrated in FIG. 5. The extrusion pressure was 232.6 and 202.30 bars at the 0.0 and 1.5 wt % the PEO additive, respectively. The overall lower extrusion pressure equated to better processability and a wider process window. It was concluded that the polarity and hydrophilicity of the PEO additive enhanced the HFC-134a and HFC-152a solubility in the polystyrene melt, lowered viscosity, and reduced the overall pressures of the extrusion process.

It was noted that there were not any adverse and/or negative impact on the general physical and thermal properties of the extruded foam board when the PEO additive was used in the foamable composition.

Scanning Electron Microscopy (SEM)

Figure 6:
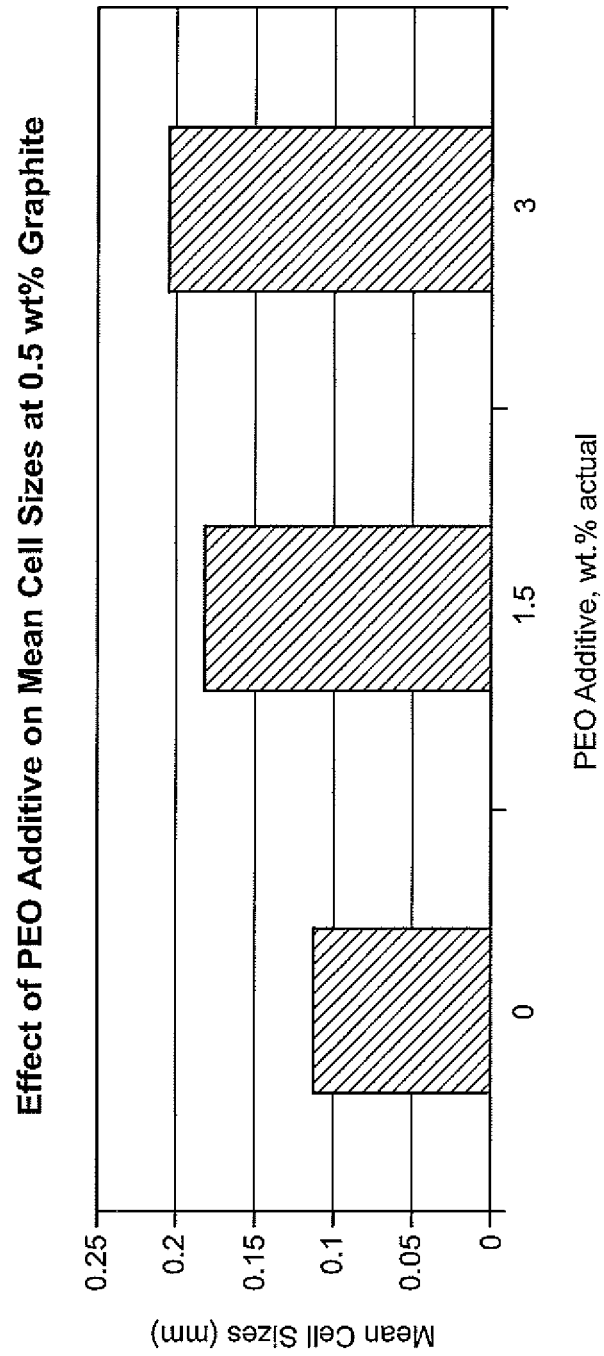
FIG. 6 is a graphical illustration of the effect of the copolymer of polyethylene oxide grafted to styrene-maleic anhydride on mean cell sizes at 0.5 wt % graphite loading as measured by scanning electron microscopy.
Figure 7:
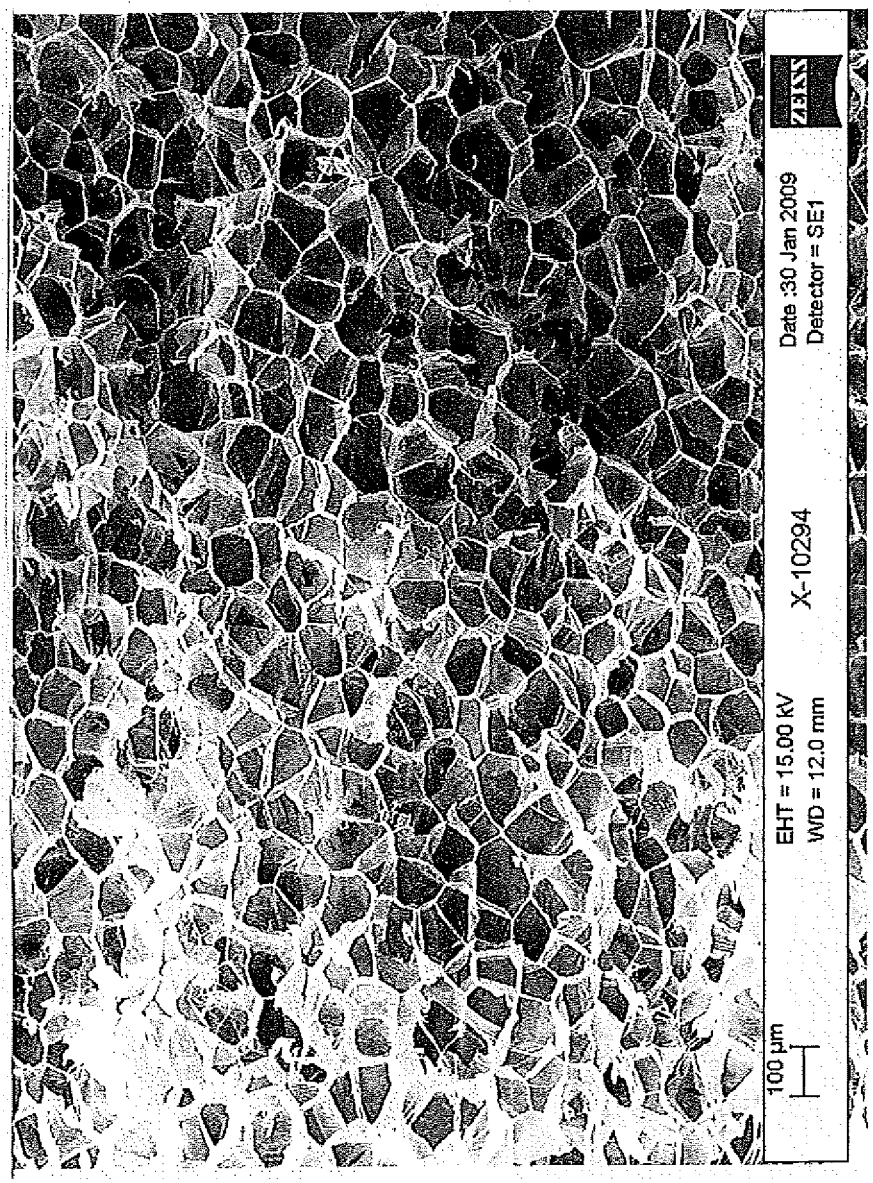
FIG. 7 is scanning electron micrograph of a sample of an extruded polystyrene foam board containing 0.5 wt % graphite and 0.0 wt % of the copolymer of polyethylene oxide grafted to styrene-maleic anhydride.
Figure 8:
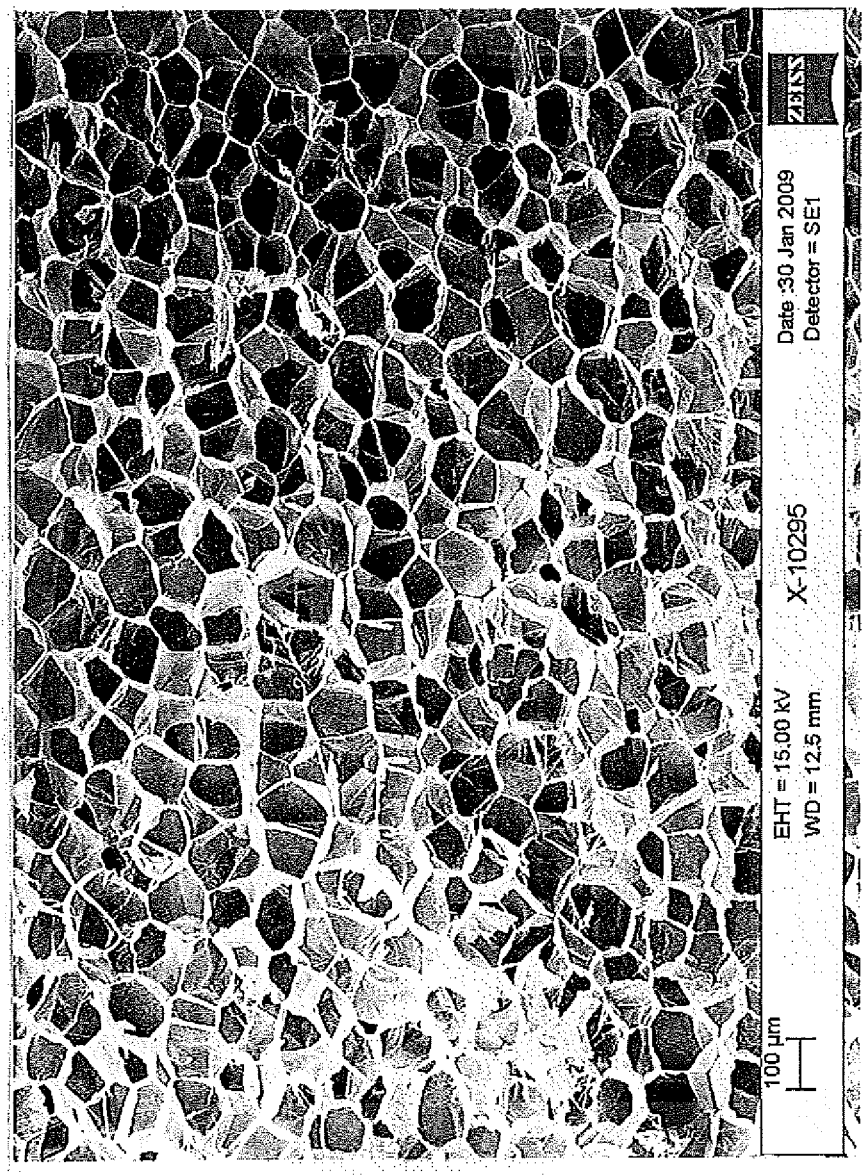
FIG. 8 is scanning electron micrograph of a sample of an extruded polystyrene foam board containing 1.0 wt % graphite and 0.0 wt % of the copolymer of polyethylene oxide grafted to styrene-maleic anhydride.
Figure 9:
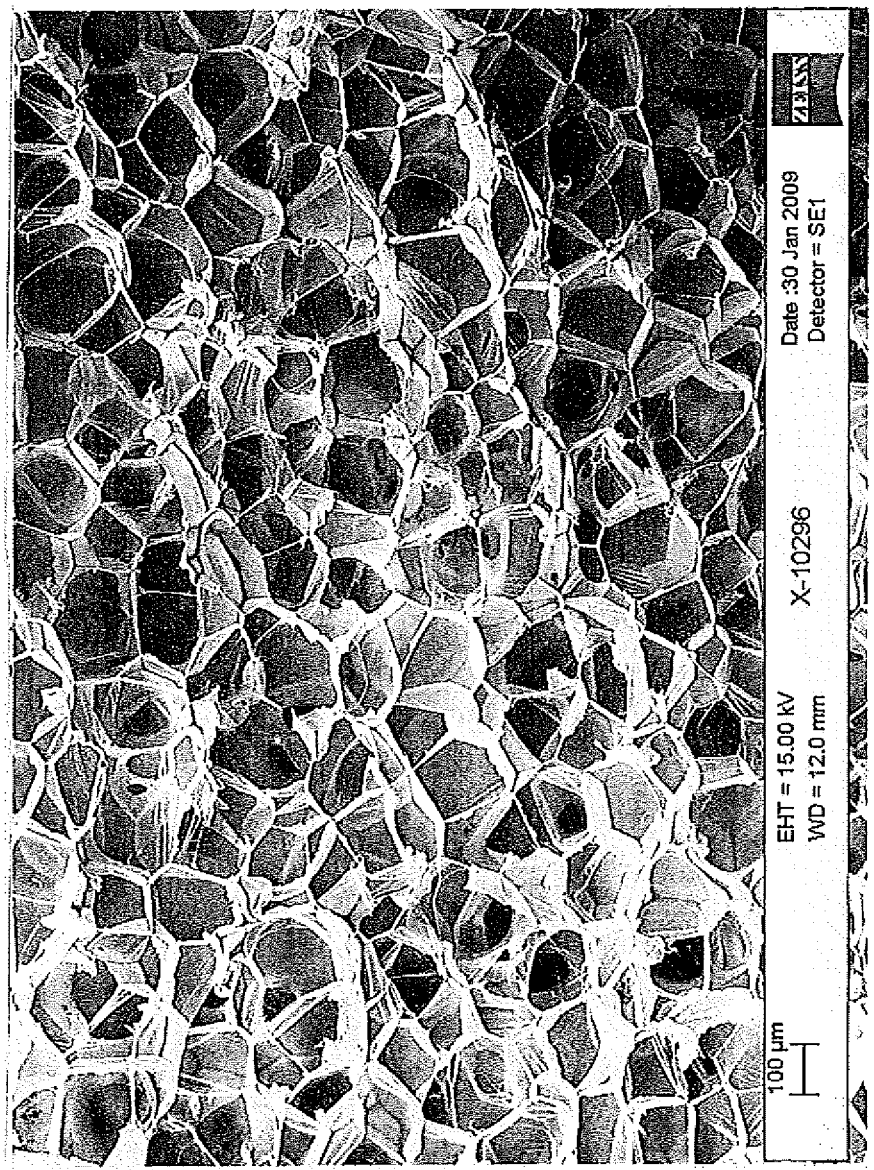
FIG. 9 is scanning electron micrograph of a sample of an extruded polystyrene foam board containing 0.5 wt % graphite and 1.5 wt % of the copolymer of polyethylene oxide grafted to styrene-maleic anhydride.
Figure 10:
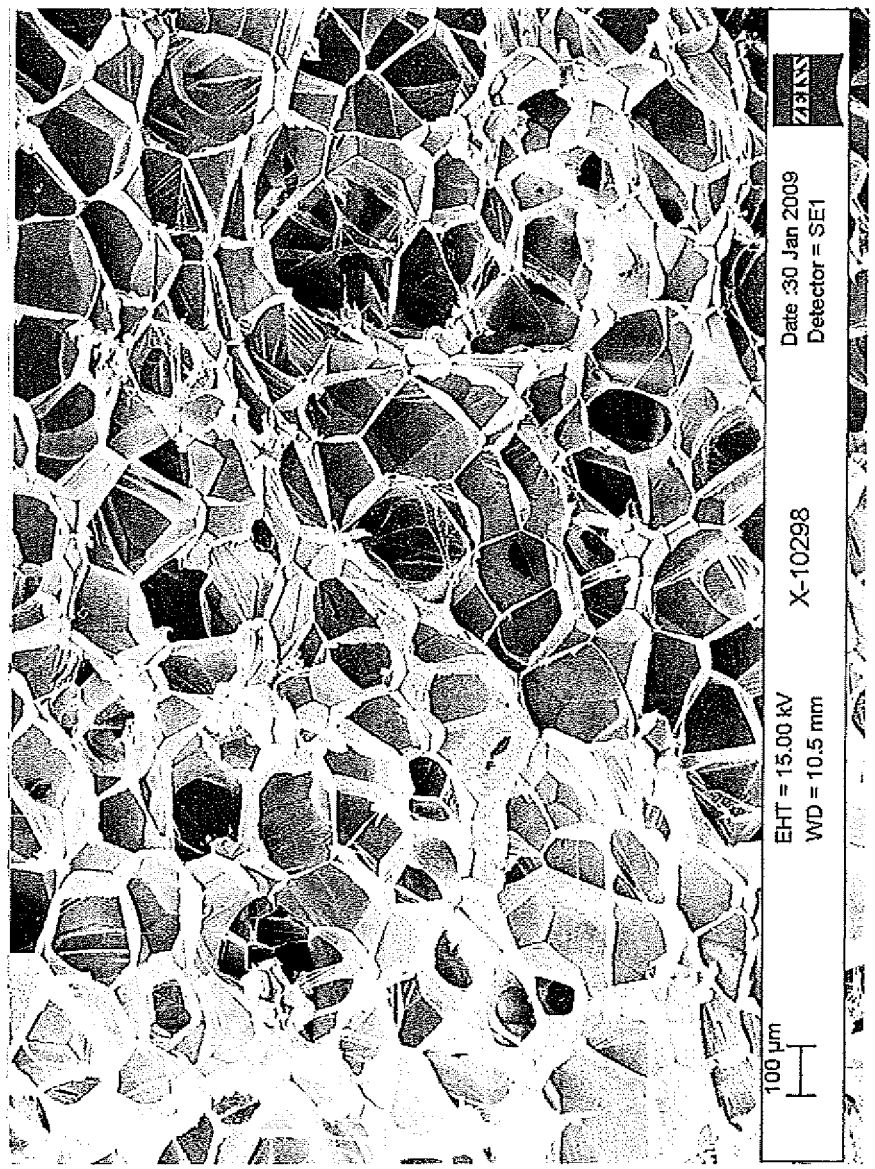
FIG. 10 is scanning electron micrograph of a sample of an extruded polystyrene foam board containing 1.0 wt % graphite and 3.0 wt % of the copolymer of polyethylene oxide grafted to styrene-maleic anhydride.

The cell morphology of the foam board formed above was also studied using scanning electron microscopy (SEM). The impact of the PEO additive on the average cell sizes is depicted both in Table 3 and in FIG. 6. The average cell sizes were 0.113 mm and 0.203 mm in the presence of 0.0 and 3.0 wt % of the PEO additive, respectfully. This was calculated to be an approximate 80% increase in cell size.

TABLE 3

| | Mean Cell Sizes Measured By SEM | | |
|---|---|---|---|
| Sample | Graphite Wt % actual | PEO Additive Wt % actual | Mean Cell Sizes mm |
| Control 1 | 0.5 | 0 | 0.113 |
| Sample 2 | 0.5 | 1.5 | 0.180 |
| Sample 4 | 0.5 | 3.0 | 0.203 |

The SEM analysis of the extruded boards showed that as the cells become larger, the cell wall thickness and strut diameter generally become smaller, as is shown in Table 6.

TABLE 6

| | | PEO | | Cell Wall | | | Struts | | |
|---|---|---|---|---|---|---|---|---|---|
| Sample | Graphite Wt % actual | Add. Wt % actual | Cells/ mm² | Cell Wall/ mm | Total Cell Walls Counted | Ave. Std. Dev. | Struts/ mm² | Total Struts Counted | Ave. Std. Dev. |
| Control 1 | 0.5 | 0 | 113 | 12 | 24 | 0.9/0.41 | 170 | 170 | 3.5/1.02 |
| Sample 1 | 1.0 | 1.0 | 112 | 12.5 | 25 | 0.6/0.21 | 172 | 172 | 2.6/0.63 |
| Sample 2 | 0.5 | 1.5 | 71 | 8.0 | 16 | 1.0/0.35 | 106 | 106 | 4.7/0.92 |
| Sample 4 | 0.5 | 3.0 | 61 | 8.0 | 16 | 1.4/0.74 | 106 | 106 | 5.3/2.05 |

The impact of the PEO additive on cell morphology in the presence of 0.5 and 1.0 wt % graphite is depicted in the SEM micrographs depicted in FIGS. 7-10.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A composition for forming a closed cell, rigid thermoplastic polymer foam comprising:
   polystyrene;
   at least one blowing agent;
   at least one infrared attenuating agent; and
   from about 0.5 to about 15% by weight polystyrene/polyethylene oxide copolymer having the formula

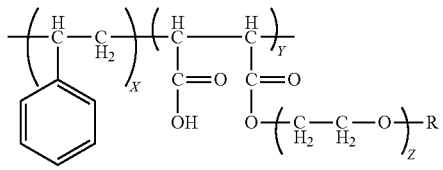

where X is from 100 to 2,500, Y is from 20 to 500, Z is from 5 to 50, and R is $C_1$-$C_{25}$, and wherein the % by weight is of the total dry components of the composition.

2. The composition of claim 1, wherein said composition further comprises a foamable polymer material is selected from polyvinyl chloride, chlorinated polyvinyl chloride, polyethylene, polypropylene, polycarbonates, polyisocyanurates, polyetherimides, polyamides, polyesters, polycarbonates, polymethylmethacrylate, poyphenylene oxide, polyurethanes, phenolics, polyolefins, styreneacrylonitrile, acrylonitrile butadiene styrene, acrylic/styrene/acrylonitrile block terpolymer, polysulfone, polyurethane, polyphenylenesulfide, acetal resins, polyamides, polyaramides, polyimides, polyacrylic acid esters, copolymers of ethylene and propylene, copolymers of styrene and butadiene, copolymers of vinylacetate and ethylene, rubber modified polymers, thermoplastic polymer blends, and combinations thereof.

3. The composition of claim 1, wherein said at least one blowing agent is selected from hydrofluorocarbons, $C_1$ to $C_9$ aliphatic hydrocarbons, $C_1$ to $C_3$ aliphatic alcohols, carbon dioxide, acetone, natural gases, air, water, ketones, ethers, methyl formate, hydrogen peroxide and combinations thereof.

4. The composition of claim 1, wherein said polystyrene/polyethylene oxide copolymer enhances the solubility of hydrofluorocarbon blowing agents in a polymer melt.

5. The composition of claim 1, wherein said at least one infrared attenuating agent is selected from nanographite, carbon black, powdered amorphous carbon, activated carbon, asphalt, granulated asphalt, milled glass, fiber glass strands, mica, black iron oxide, metal flakes, carbon nanotube, nanographene platelets, carbon nanofiber, activated carbon, titanium dioxide and combinations thereof.

6. The composition of claim 1, wherein:
   said at least one infrared attenuating agent is present in said composition in an amount from about 0.01 to about 10% by weight of the total dry components of the composition; and
   said polystyrene/polyethylene oxide copolymer is present in said composition in an amount from about 0.5 to about 3% by weight of the total dry components of the composition.

7. A rigid thermoplastic polymer foam product comprising:
   an extruded foamable composition, said foamable composition including:
   polystyrene;
   at least one blowing agent;
   at least one infrared attenuating agent; and
   from about 0.5 to about 15% by weight polystyrene/polyethylene oxide copolymer having the formula

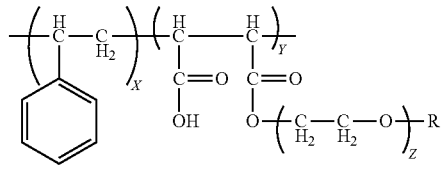

where X is from 100 to 2,500, Y is from 20 to 500, Z is from 5 to 50, and R is $C_1$-$C_{25}$, and wherein the % by weight is of the total dry components of the composition.

8. The thermoplastic polymer foam product of claim 7, wherein said at least one blowing agent is selected from hydrofluorocarbons, $C_1$ to $C_9$ aliphatic hydrocarbons, $C_1$ to $C_3$ aliphatic alcohols, carbon dioxide, acetone, natural gases, air, water, ketones, ethers, methyl formate, hydrogen peroxide and combinations thereof.

9. The thermoplastic polymer foam product of claim 8, wherein said polystyrene/polyethylene oxide copolymer provides a cell size from about 0.1 mm to about 0.2 mm in said polymer foam product.

10. The thermoplastic polymer foam product of claim 8, wherein said at least one infrared attenuating agent is selected from nanographite, carbon black, activated carbon, powdered amorphous carbon, asphalt, granulated asphalt, milled glass, fiber glass strands, mica, black iron oxide, metal flakes, carbon nanotube, nanographene platelets, carbon nanofiber, activated carbon, titanium dioxide and combinations thereof.

11. The thermoplastic polymer foam product of claim 8, wherein said polystyrene/polyethylene oxide copolymer enhances the solubility of hydrofluorocarbon blowing agents in a polymer melt.

12. The rigid thermoplastic polymer foam product of claim 7, wherein the rigid thermoplastic polymer foam product has a cell size from about 0.1 mm to about 0.2 mm and an R-value ranging from 5 to 7.

13. A rigid thermoplastic polymer foam product comprising:
    an extruded foamable composition, said foamable composition including:
    polystyrene;
    a hydrofluorocarbon blowing agent;
    at least one infrared attenuating agent; and
    from about 0.5 to about 15% by weight polystyrene/polyethylene oxide copolymer having the formula

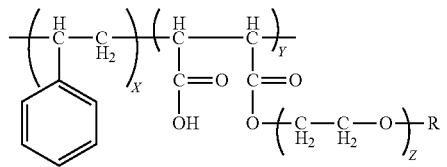

where X is from 100 to 2,500, Y is from 20 to 500, Z is from 5 to 50, and R is $C_1$-$C_{25}$, and wherein the % by weight is of the total dry components of the composition.

* * * * *